United States Patent [19]
Muto

[11] Patent Number: 5,533,068
[45] Date of Patent: Jul. 2, 1996

[54] FREQUENCY ERROR DETECTING DEVICE CAPABLE OF CORRECTLY DETECTING A FREQUENCY ERROR BETWEEN A CARRIER FREQUENCY AND A STANDARD FREQUENCY

[75] Inventor: Hiroyasu Muto, Tokyo, Japan

[73] Assignee: NEC Corporation, Japan

[21] Appl. No.: 157,702

[22] Filed: Nov. 24, 1993

[30] Foreign Application Priority Data

Nov. 25, 1992 [JP] Japan .................... 4-314769

[51] Int. Cl.⁶ ............................................ H04L 27/06
[52] U.S. Cl. ............................................ 375/344
[58] Field of Search ............................ 375/97; 329/302, 329/304, 306, 307, 324

[56] References Cited

U.S. PATENT DOCUMENTS

| | | | |
|---|---|---|---|
| 5,001,727 | 3/1991 | McDavid | 375/324 |
| 5,062,123 | 10/1991 | Geile et al. | 375/97 X |

FOREIGN PATENT DOCUMENTS

| | | |
|---|---|---|
| 413153 | 7/1990 | European Pat. Off. . |
| 2207582 | 2/1989 | United Kingdom . |
| 8905780 | 12/1989 | WIPO . |

*Primary Examiner*—Stephen Chin
*Assistant Examiner*—Kevin Kim
*Attorney, Agent, or Firm*—Ostrolenk, Faber, Gerb & Soffen

[57] ABSTRACT

Supplied with a transmitted signal defined by a sequence signal vectors each of which has a phase variation equal to a predetermined phase variation. A demodulator (11) quadrature demodulates a transmitted signal into a demodulated signal with reference to a standard signal of a standard frequency. The demodulated signal is defined by a sequence of demodulated vectors. An A/D section (21, 22) samples the demodulated vectors at a predetermined sampling rate to quantize the demodulated vectors into quantized vectors. A signal processor (31) compounds a composite vector from the quantized vectors within a predetermined number of the quantized vectors. The signal processor calculates a phase difference between the composite vector and a predetermined vector to detect a frequency error between the standard frequency and a carrier frequency of the transmitted signal.

7 Claims, 4 Drawing Sheets

FREQUENCY ERROR DETECTING DEVICE CAPABLE OF CORRECTLY DETECTING A FREQUENCY ERROR BETWEEN A CARRIER FREQUENCY AND A STANDARD FREQUENCY

BACKGROUND OF THE INVENTION

This invention relates to a frequency error detecting device for detecting a frequency error between a carrier frequency and a standard frequency in a quadrature demodulator.

A quadrature demodulator is used for quadrature demodulating a received signal into a demodulated signal. The received signal is transmitted as a transmitted signal from a transmission section through a transmission path which may be a radio channel. The transmitted signal is derived by modulating a carrier signal at a frame period by a data signal. As a result, the transmitted signal has a sequence of symbols at a predetermined symbol rate. The carrier signal has a carrier frequency. In order to quadrature demodulate the received signal into the demodulated signal, it is generally necessary to regenerate the carrier signal as a regenerated carrier signal from the demodulated signal in the quadrature demodulator.

On the other hand, another quadrature demodulator is known as a conventional quadrature demodulator which quadrature demodulates the received signal into the demodulated signal without use of the regenerated carrier signal. The conventional quadrature demodulator quadrature demodulates the received signal into the demodulated signal by the use of a standard signal having a standard frequency. The conventional quadrature demodulator is disclosed in Japanese examined publication Tokkai Hei 3-128550, namely, 128550/1991.

In order to make the standard frequency be coincident with the carrier frequency, it is necessary to preliminarily detecting a frequency error between the carrier frequency and the standard frequency as a detected frequency error. Namely, it is necessary to preliminarily compensate the standard frequency by the use of the detected frequency error.

On compensating the standard frequency, a frequency error detecting signal is used as the received signal. The frequency error detecting signal is defined by a sequence of signal vectors among which a phase variation is equal to a predetermined phase variation. As a result, the demodulated signal is defined by a sequence of demodulated vectors.

A conventional frequency error detecting device is supplied with the demodulated signal as a first signal. The conventional frequency error detecting device is further supplied with a second signal which is obtained by quadrature demodulating the received signal on the basis of the carrier signal. The conventional frequency error detecting device calculates the detected frequency error in accordance with the first and the second signals.

By the way, the conventional frequency error detecting device comprises an analog-digital (A/D) converter for sampling the demodulated signal at a predetermined sampling rate to quantize the demodulated signal into a quantized signal. The A/D converter generally has an offset frequency. As a result, the quantized signal may include the offset frequency. The conventional frequency error detecting device further comprises a signal processor for calculating the detected frequency error on the basis of the quantized signal and the second signal.

Furthermore, the received signal is inevitably subjected to a noise when transmitted through the radio channel. As a result, the demodulated signal is accompanied by a noise signal.

As readily understood from the above description, it is difficult to correctly detect the frequency error in the conventional frequency error detecting device by existence of the offset frequency and the noise signal.

SUMMARY OF THE INVENTION

It is therefore an object of this invention to provide a frequency error detecting device capable of correctly detecting a frequency error between a standard frequency and a carrier frequency.

Other objects of this invention will become clear as the description proceeds.

On describing the gist of this invention, it is possible to understand that a frequency error detecting device is for use in combination with a demodulating section for receiving a transmitted signal through a transmission path to quadrature demodulate the transmitted signal into a demodulated signal with reference to a standard signal of a standard frequency. The transmitted signal is defined by a signal vector sequence including a set of signal vectors each of which has a phase variation equal to a predetermined phase variation. The demodulated signal is defined by a sequence of demodulated vectors. The frequency error detecting device is for detecting a frequency error between the standard frequency and a carrier frequency of the transmitted signal to produce a frequency error signal.

According to this invention, the above-understood frequency error detecting device comprises first means for sampling the demodulated vectors at a predetermined sampling rate to quantize the demodulated vectors into quantized vectors, second means for compounding a composite vector from the quantized vectors within a predetermined number of the quantized vectors, and third means for calculating a phase difference between the composite vector and a predetermined vector to produce the frequency error signal.

DESCRIPTION OF THE PREFERRED EMBODIMENT

Figure 1:
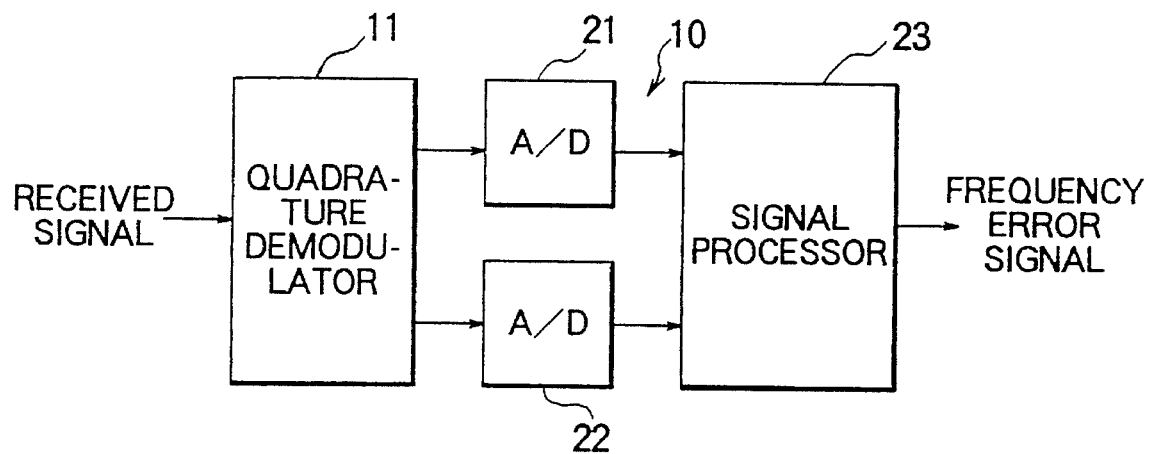
FIG. 1 is a block diagram of a conventional frequency error detecting device together with a quadrature demodulator.

Referring to FIG. 1, description will first be made as regards a conventional frequency error detecting device 10 for a better understanding of this invention. The frequency error detecting device 10 is connected to a quadrature demodulator 11 for quadrature demodulating a received signal into a demodulated signal on the basis of a standard signal of a standard frequency. The received signal is transmitted as a transmitted signal from a transmission section (not shown) through a transmission path which may be a radio channel. The transmitted signal is produced by quadrature modulating a carrier signal by a data signal. The carrier signal has a carrier frequency.

In order to quadrature demodulate the received signal into the demodulated signal, it is necessary to preliminarily make the standard frequency be coincident with the carrier frequency. Namely, it is necessary to detect a frequency error between the standard frequency and the carrier frequency. On detecting the frequency error, a frequency error detecting signal is used as the received signal.

The frequency error detecting signal is defined by a signal vector sequence including a set of signal vectors each of which has a phase variation equal to a predetermined phase variation. Namely, a selected one of the signal vectors has the phase variation which is equal to the phase variation of adjacent signal vectors adjacent to the selected vectors.

Figure 2:
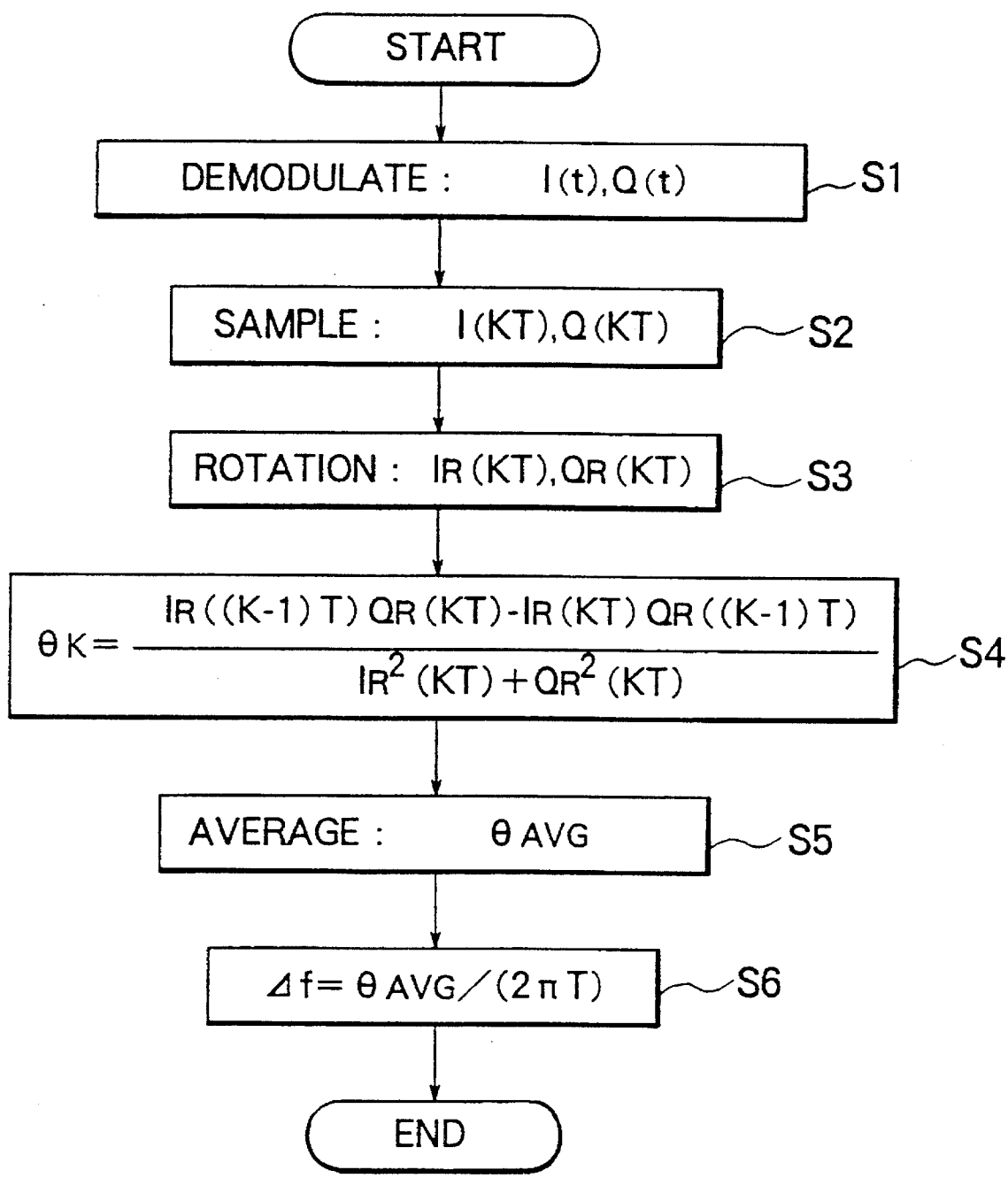
FIG. 2 is a flow chart for describing operation of the conventional frequency error detecting device illustrated in FIG. 1.

Referring to FIG. 2 in addition to FIG. 1, the quadrature demodulator 11 receives the frequency error detecting signal as the received signal to quadrature demodulate the frequency error detecting signal into a demodulated frequency error detecting signal at a first step S1 in FIG. 2. The demodulated frequency error detecting signal is defined by a sequence of demodulated vectors each of which has an inphase component and a quadrature component. Namely, each of the demodulated vectors is defined by the inphase component I(t) and the quadrature component Q(t), where t represents a time instant.

The inphase component I(t) and the quadrature component Q(t) are supplied to first and second A/D converters 21 and 22, respectively, at every demodulated vectors. The first A/D converter 21 samples the inphase component I(t) at a predetermined sampling rate, for example, a symbol rate of the demodulated frequency error detecting signal to quantize the inphase component I(t) into a quantized inphase component I(kT) at a second step S2 in FIG. 2, where k is a positive integer between zero and (N−1). T represents a symbol period. N represents the number of demodulated vectors. Similarly, the second A/D converter 22 samples the quadrature component Q(t) at the predetermined sampling rate to quantize the quadrature component Q(t) into a quantized quadrature component Q(kT). The quantized inphase component I(kT) and the quantized quadrature component Q(kT) are supplied as a quantized vector (I(kT), Q(kT)) to a signal processor 23.

Figure 3:
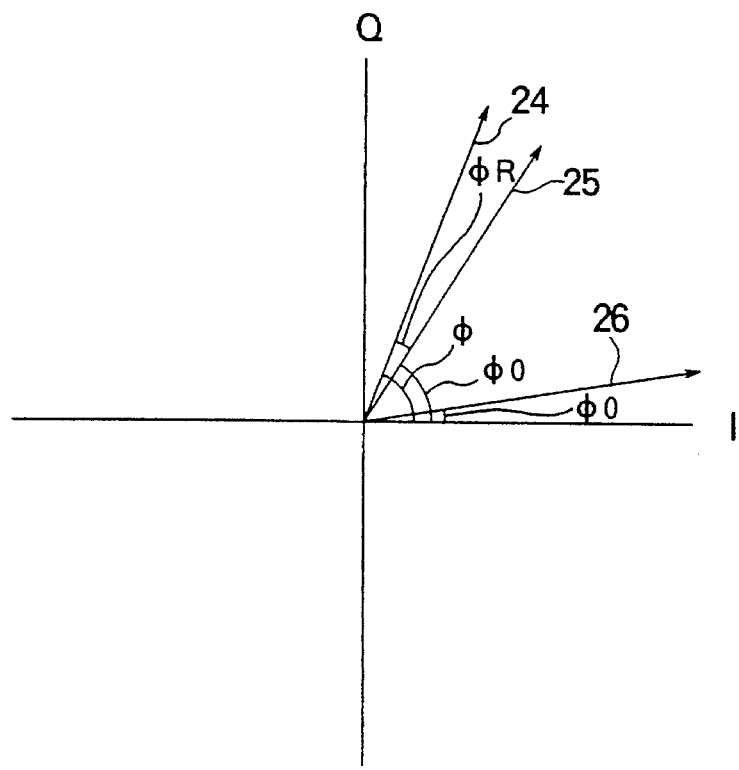
FIG. 3 is a diagram for describing rotation of signal vectors.

Referring to FIG. 3 in addition to FIGS. 1 and 2, it will be assumed that the quantized vector (I(kT), Q(kT)) is illustrated as a vector 24 in FIG. 3. The signal processor 23 rotates the vector 24 towards a clockwise direction by a phase angle of a predetermined vector $(I_0(kT), Q_0(kT))$ which is illustrated as a vector 25 in FIG. 3. As a result, the signal processor 23 obtains a rotated vector $(I_R(kT), Q_R(kT))$ which is illustrated as a vector 26 in FIG. 3. The predetermined vector $(I_0(kT), Q_0(kT))$ is obtained on quadrature demodulating the frequency error detecting signal in accordance with the carrier signal.

Now, it will be assumed that the quantized vector (I(kT), Q(kT)) has a first phase angle $\phi$. The predetermined vector $(I_0(kT), Q_0(kT))$ has a second phase angle $\phi_0$. The rotated vector $(I_R(kT), Q_R(kT))$ has a third phase angle $\phi_R$. The first, the second, and the third phase angles $\phi$, $\phi_0$, and $\phi_R$ are represented by Equations (1) to (3), respectively.

$$(|r(kT)|\cos \phi(kT), |r(kT)|\sin \phi(kT))=(I(kT), Q(kT)) \quad (1)$$

$$(|r_0(kT)|\cos \phi_0(kT), |r_0(kT)|\sin \phi_0(kT))=(I_0(kT), Q_0(kT)) \quad (2)$$

$$(|r_R(kT)|\cos \phi_R(kT), |r_R(kT)|\sin \phi_R(kT))=(I_R(kT), Q_R(kT)) \quad (3)$$

where |r(kT)| represents a length of the quantized vector (I(kT), Q(kT)). $|r_0(kT)|$ represents a length of the predetermined vector $(I_0(kT), Q_0(kT))$. $|r_R(kT)|$ represents a length of the rotated vector $(I_R(kT), Q_R(kT))$. |r(kT)| is equal to $|r_R(kT)|$.

The signal processor 23 calculates the rotated vector $(I_R(kT), Q_R(kT))$ by Equation (4) at a third step S3 in FIG. 2.

$$\begin{bmatrix} I_R(kT) \\ Q_R(kT) \end{bmatrix} = \begin{bmatrix} \cos(\phi_0(kT)) & \sin(-\phi_0(kT)) \\ \sin(-\phi_0(kT)) & \cos(-\phi_0(kT)) \end{bmatrix} \begin{bmatrix} I(kT) \\ Q(kT) \end{bmatrix} \quad (4)$$

$$= 1/|r_0(kT)| \begin{bmatrix} I_0(kT) & Q_0(kT) \\ -Q_0(kT) & I_0(kT) \end{bmatrix} \begin{bmatrix} I(kT) \\ Q(kT) \end{bmatrix}$$

When the standard frequency is coincident with the carrier frequency, a phase variation of the quantized vector (I(kT), Q(kT)) is equal to that of the predetermined vector $(I_0(kT), Q_0(kT))$. Therefore, the phase of the rotated vector $(I_R(kT), Q_R(kT))$ is not varied.

When the frequency error exists between the standard frequency and the carrier frequency, the phase of the rotated vector $(I_R(kT), Q_R(kT))$ is varied. When the time instant t is changed from (k−1)T to kT, a phase variation $\theta_k$ is represented by Equation (5).

$$\theta_k = \phi(kT) - \phi((k-1)T) \quad (5)$$

In addition, since $\theta_k$ is represented by Equation (6).

$$\sin\theta_k = \frac{I_R((k-1)T)Q_R(kT) - I_R(kT)Q_R((k-1)T)}{|r_R((k-1)T)| \cdot |r_R(kT)|} \quad (6)$$

In Equation (6), $|r_R((k-)T)|$ is approximately equal to $|r_R(kT)|$. When $\theta_k$ is very little, $\theta_k$ is approximately equal to $\sin \theta_k$. As a result, the phase variation $\theta_k$ is represented by Equation (7). The signal processor 23 calculates the phase variation $\theta_k$ by the use of Equation (7) at a fourth step S4 in FIG. 2.

$$\theta_k = \frac{I_R((k-1)T)Q_R(kT) - I_R(kT)Q_R((k-1)T)}{I_R^2(kT) + Q_R^2(kT)} \quad (7)$$

Furthermore, an average $\theta_{AVG}$ of the phase variation $\theta_k$ at each one of symbols is represented by Equation (8). The signal processor 23 calculates the average $\theta_{AVG}$ by the use of Equation (8) at a fifth step S5 in FIG. 2. The signal processor 23 divides $\theta_{AVG} 2\pi$ (rad) by T(sec) to obtain the frequency error at a sixth step S6 in FIG. 2. The signal processor 23 outputs the frequency error as a frequency error signal.

$$\theta_{AVG} = \frac{1}{N} \sum_{k=0}^{N-1} \theta_k \quad (8)$$

By the way, the first and the second A/D converters 21 and 22 may have first and second offsets which may be equal to each other. When the first and the second A/D converters 21 and 22 have the first and the second offsets, respectively, the phase variation $\theta_k$ includes an error based on the first and the second offsets.

In addition, the frequency error detecting signal is inevitably subjected to noise on the radio channel. In this event, the phase variation $\theta_k$ is not equal to the predetermined phase variation in each of the signal vectors of the frequency error detecting signal. As a result, the phase variation $\theta_k$ includes an error based on the noise.

Now, a k-th quantized vector is represented by (I(kT), Q(kT)). A zeroth quantized vector is represented by (I(0), Q(0)). An offset vector based on the first and the second offsets is represented by (I', Q'). A noise vector based on the noise is represented by $(n_{Ii}, n_{Qi})$. Each of the first and the second offsets has an offset phase represented by $\theta$. The k-th quantized vector is represented by Equation (9).

$$\begin{bmatrix} I(kT) \\ Q(kT) \end{bmatrix} = \begin{bmatrix} \cos(\pi/2 + \theta) & -\sin(\pi/2 + \theta) \\ \sin(\pi/2 + \theta) & \cos(\pi/2 + \theta) \end{bmatrix}^k \begin{bmatrix} I(0) \\ Q(0) \end{bmatrix} - \begin{bmatrix} I' \\ Q' \end{bmatrix} + \begin{bmatrix} n_{Ik} \\ n_{Qk} \end{bmatrix} \quad (9)$$

As readily understood from Equation (9), the signal processor 23 does not correctly detect the frequency error between the standard frequency and the carrier frequency by the offset vector and the noise vector.

Now, description will proceed to a frequency error detecting device according to a preferred embodiment of this invention. Again referring to FIG. 1, it will be assumed that the frequency error detecting signal is defined by the signal vectors which rotate by a phase angle $\Delta\phi$ in each one of symbols. When the zeroth quantized vector, the offset vector, and the noise vector are given by (I(0), Q(0)), (I',Q'), and $(n_{Ii}, n_{Qi})$, respectively, the k-th quantized vector (I(kT), Q(kT)) is given by Equation (10).

$$\begin{bmatrix} I(kT) \\ Q(kT) \end{bmatrix} = \begin{bmatrix} \cos(\Delta\phi + \theta) & -\sin(\Delta\phi + \theta) \\ \sin(\Delta\phi + \theta) & \cos(\Delta\phi + \theta) \end{bmatrix}^k \begin{bmatrix} I(0) \\ Q(0) \end{bmatrix} - \begin{bmatrix} I' \\ Q' \end{bmatrix} + \begin{bmatrix} n_{Ik} \\ n_{Qk} \end{bmatrix} \quad (10)$$

When the sum of the phase variations in the quantized vectors is equal to $\pi$ radians, the number M of symbols is given by:

$$M = \pi/\Delta\phi \quad (11)$$

When the k-th quantized vector (I(kT), Q(kT)) is rotated towards the clockwise direction by the phase angle $\Delta\phi$, the quantized vectors of 2M, which are successive to one another, is arranged into an averaged vector $x_k(\theta), y_k(\theta))$ which is given by:

$$\begin{bmatrix} x_k(\theta) \\ y_k(\theta) \end{bmatrix} = \frac{1}{2M} \sum_{i=k}^{k+2M-1} \begin{bmatrix} \cos(-\Delta\phi) & -\sin(-\Delta\phi) \\ \sin(-\Delta\phi) & \cos(-\Delta\phi) \end{bmatrix}^i \begin{bmatrix} I(iT) \\ Q(iT) \end{bmatrix} \quad (12)$$

$$= \frac{1}{2M} \sum_{i=k}^{k+2M-1} \begin{bmatrix} \cos\theta & -\sin\theta \\ \sin\theta & \cos\theta \end{bmatrix}^i \begin{bmatrix} I(0) \\ Q(0) \end{bmatrix} -$$

$$\frac{1}{2M} \sum_{i=k}^{k+2M-1} \begin{bmatrix} \cos(-\Delta\phi) & -\sin(-\Delta\phi) \\ \sin(-\Delta\phi) & \cos(-\Delta\phi) \end{bmatrix}^i \begin{bmatrix} I' \\ Q' \end{bmatrix} +$$

$$\frac{1}{2M} \sum_{i=k}^{k+2M-1} \begin{bmatrix} \cos(-\Delta\phi) & -\sin(-\Delta\phi) \\ \sin(-\Delta\phi) & \cos(-\Delta\phi) \end{bmatrix}^i \begin{bmatrix} n_{Ii} \\ n_{Qi} \end{bmatrix}$$

$$= \frac{1}{2M} \sum_{i=k}^{k+2M-1} \begin{bmatrix} \cos\theta & -\sin\theta \\ \sin\theta & \cos\theta \end{bmatrix}^i \begin{bmatrix} I(0) \\ Q(0) \end{bmatrix} +$$

$$\frac{1}{2M} \sum_{i=k}^{k+2M-1} \begin{bmatrix} \cos(-\Delta\phi) & -\sin(-\Delta\phi) \\ \sin(-\Delta\phi) & \cos(-\Delta\phi) \end{bmatrix}^i \begin{bmatrix} n_{Ii} \\ n_{Qi} \end{bmatrix}$$

$$= \frac{1}{2M} \begin{bmatrix} \cos\theta & -\sin\theta \\ \sin\theta & \cos\theta \end{bmatrix}^k \begin{bmatrix} \sum_{i=0}^{2M} \begin{bmatrix} \cos\theta & -\sin\theta \\ \sin\theta & \cos\theta \end{bmatrix}^i \end{bmatrix} \begin{bmatrix} I(0) \\ Q(0) \end{bmatrix} +$$

$$\frac{1}{2M} \sum_{i=k}^{k+2M-1} \begin{bmatrix} \cos(-\Delta\phi) & -\sin(-\Delta\phi) \\ \sin(-\Delta\phi) & \cos(-\Delta\phi) \end{bmatrix}^i \begin{bmatrix} n_{Ii} \\ n_{Qi} \end{bmatrix}$$

$$= \begin{bmatrix} \cos(k\theta) & -\sin(k\theta) \\ \sin(k\theta) & \cos(k\theta) \end{bmatrix} \begin{bmatrix} x_0(\theta) \\ y_0(\theta) \end{bmatrix} + \begin{bmatrix} n_{xk} \\ n_{yk} \end{bmatrix}$$

Where a vector $(x_0(\theta), y_0(\theta))$ is given by:

$$\begin{bmatrix} x_0(\theta) \\ y_0(\theta) \end{bmatrix} = \frac{1}{2M} \begin{bmatrix} \sum_{i=0}^{2M} \begin{bmatrix} \cos\theta & -\sin\theta \\ \sin\theta & \cos\theta \end{bmatrix}^i \end{bmatrix} \begin{bmatrix} I(0) \\ Q(0) \end{bmatrix} \quad (13)$$

A vector $(n_{xk}, n_{yk})$ is given by:

$$\begin{bmatrix} n_{xk} \\ n_{yk} \end{bmatrix} = \frac{1}{2M} \sum_{i=k}^{k+2M-1} \begin{bmatrix} \cos(-\Delta\phi) & -\sin(-\Delta\phi) \\ \sin(-\Delta\phi) & \cos(-\Delta\phi) \end{bmatrix}^i \begin{bmatrix} n_{Ii} \\ n_{Qi} \end{bmatrix} \quad (14)$$

It is readily understood from Equations (12) to (14) that the offset vector is removed from the averaged vector. Furthermore, it is readily understood that the noise vector decreases by connection given by:

$$E[|(n_{Ik}, n_{Qk})|] \geq E[|(n_{xk}, n_{yk})|] \quad (15)$$

where E[a] represents the average of a.

When it will be assumed that the frequency error detecting signal is produced by the use of Gaussian minimum shift keying, the frequency error detecting signal is defined by a sequence of the signal vectors which rotate by $\pi/2$ radians at every one symbol. As a result, Equation (10) can be rewritten to Equation (16) when the phase angle $\Delta\phi$ is equal to $\pi/2$ radians.

$$\begin{bmatrix} I(kT) \\ Q(kT) \end{bmatrix} = \begin{bmatrix} \cos(\pi/2 + \theta) & -\sin(\pi/2 + \theta) \\ \sin(\pi/2 + \theta) & \cos(\pi/2 + \theta) \end{bmatrix}^k \begin{bmatrix} I(0) \\ Q(0) \end{bmatrix} - \begin{bmatrix} I' \\ Q' \end{bmatrix} + \begin{bmatrix} n_{Ik} \\ n_{Qk} \end{bmatrix} \quad (16)$$

From Equation (11), the number M of symbols becomes equal to four. As a result, Equation (12) can be rewritten to Equation (17) inasmuch as the number M of symbols is equal to four.

$$\begin{bmatrix} x_k(\theta) \\ y_k(\theta) \end{bmatrix} = \frac{1}{4} \sum_{i=k}^{k+3} \begin{bmatrix} \cos(-\pi/2) & -\sin(-\pi/2) \\ \sin(-\pi/2) & \cos(-\pi/2) \end{bmatrix}^i \begin{bmatrix} I(iT) \\ Q(iT) \end{bmatrix} \quad (17)$$

$$= \frac{1}{4} \sum_{i=k}^{k+3} \begin{bmatrix} 0 & 1 \\ -1 & 0 \end{bmatrix}^i \begin{bmatrix} \cos(\pi/2 + \theta) & -\sin(\pi/2 + \theta) \\ \sin(\pi/2 + \theta) & \cos(\pi/2 + \theta) \end{bmatrix}^i \begin{bmatrix} I(0) \\ O(0) \end{bmatrix} -$$

$$\frac{1}{4} \sum_{i=k}^{k+3} \begin{bmatrix} 0 & 1 \\ -1 & 0 \end{bmatrix}^i \begin{bmatrix} I' \\ Q' \end{bmatrix} +$$

$$\frac{1}{4} \sum_{i=k}^{k+3} \begin{bmatrix} 0 & 1 \\ -1 & 0 \end{bmatrix}^i \begin{bmatrix} n_{Ii} \\ n_{Qi} \end{bmatrix}$$

$$= \frac{1}{4} \sum_{i=k}^{k+3} \begin{bmatrix} \cos\theta & -\sin\theta \\ \sin\theta & \cos\theta \end{bmatrix}^i \begin{bmatrix} I(0) \\ Q(0) \end{bmatrix} +$$

$$\frac{1}{4} \sum_{i=k}^{k+3} \begin{bmatrix} 0 & 1 \\ -1 & 0 \end{bmatrix}^i \begin{bmatrix} n_{Ii} \\ n_{Qi} \end{bmatrix}$$

$$= \frac{1}{4} \begin{bmatrix} \cos\theta & -\sin\theta \\ \sin\theta & \cos\theta \end{bmatrix}^k \begin{bmatrix} \sum_{i=0}^{3} \begin{bmatrix} \cos\theta & -\sin\theta \\ \sin\theta & \cos\theta \end{bmatrix}^i \end{bmatrix} \begin{bmatrix} I(0) \\ Q(0) \end{bmatrix} +$$

$$\frac{1}{4} \begin{bmatrix} 0 & 1 \\ -1 & 0 \end{bmatrix}^k \begin{bmatrix} n_{Ik} + n_{Qk+1} & -n_{Ik+2} & -n_{Qk+3} \\ n_{Qk} - n_{Ik+1} & -n_{Qk+2} & -n_{Ik+3} \end{bmatrix}$$

$$= \begin{bmatrix} \cos(k\theta) & -\sin(k\theta) \\ \sin(k\theta) & \cos(k\theta) \end{bmatrix} \begin{bmatrix} x_0(\theta) \\ y_0(\theta) \end{bmatrix} + \begin{bmatrix} n_{xk} \\ n_{yk} \end{bmatrix}$$

In addition, Equations (13) and (14) can be rewritten to Equations (18) and (19), respectively.

$$\begin{bmatrix} x_0(\theta) \\ y_0(\theta) \end{bmatrix} = \frac{1}{4} \begin{bmatrix} \sum_{i=0}^{3} \begin{bmatrix} \cos\theta & -\sin\theta \\ \sin\theta & \cos\theta \end{bmatrix}^i \end{bmatrix} \begin{bmatrix} I(0) \\ Q(0) \end{bmatrix} \quad (18)$$

$$\begin{bmatrix} n_{xk} \\ n_{yk} \end{bmatrix} = \frac{1}{4} \begin{bmatrix} 0 & 1 \\ -1 & 0 \end{bmatrix}^k \begin{bmatrix} n_{Ik} + n_{Qk+1} & -n_{Ik+2} & -n_{Qk+3} \\ n_{Qk} - n_{Ik+1} & -n_{Qk+2} & -n_{Ik+3} \end{bmatrix} \quad (19)$$

As readily understood from Equations (17) to (19), the offset vector is removed from the averaged vector. Furthermore, it is readily understood that the noise vector decreases from the connection given by Equation (15).

Figure 4:
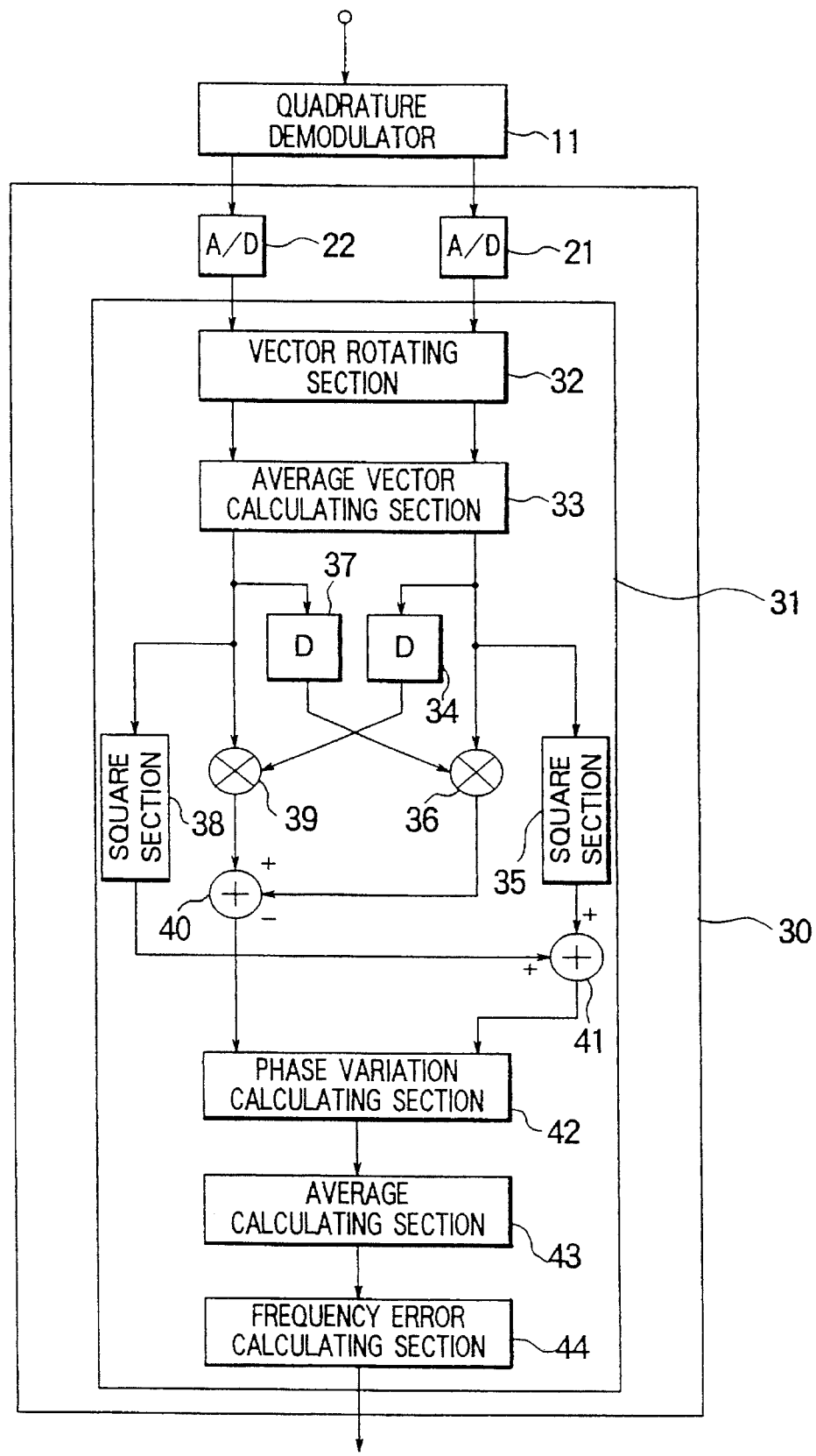
FIG. 4 is a block diagram of a frequency error detecting device according to a preferred embodiment of this invention.

Referring to FIG. 4, the illustrated frequency error detecting device is different from the frequency error detecting device 10 illustrated in FIG. 1 and is therefore designated afresh by a reference numeral 30.

The frequency error detecting device 30 comprises the first and the second A/D converters 21 and 22 and a signal processor 31 which is connected to the first and the second A/D converters 21 and 22. The first and the second A/D converters 21 and 22 are connected to the quadrature demodulator 11.

Figure 5:
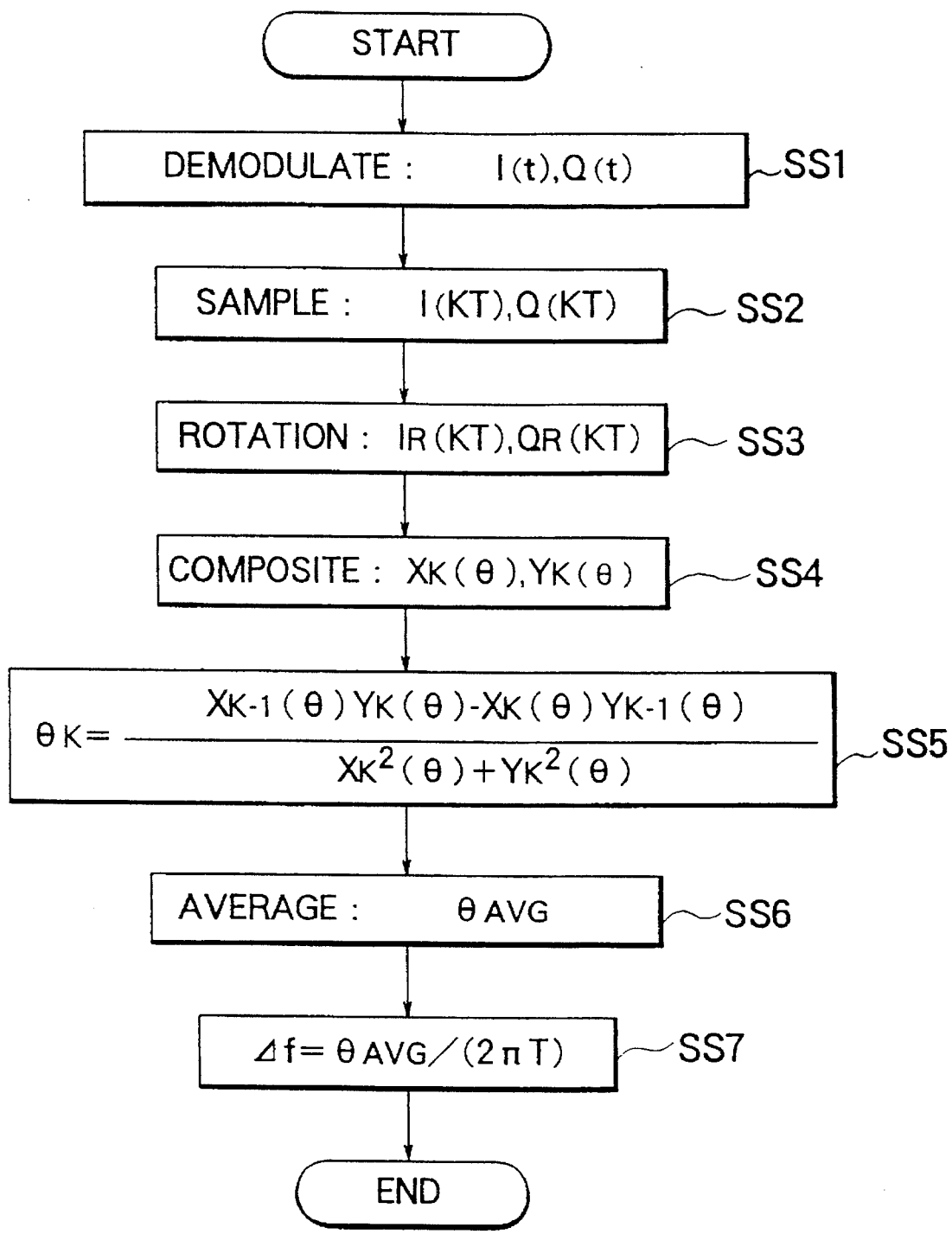
FIG. 5 is a flow chart for describing operation of the frequency error detecting device illustrated in FIG. 4.

Referring to FIG. 4 in addition to FIG. 5, the quadrature demodulator 11 produces the demodulated frequency error detecting signal which is defined by the demodulated vectors each of which has the inphase component and the quadrature component (Step SS1). The first A/D converter 21 successively receives the inphase component I(t) and successively supplies the quantized inphase component I(kT) to the signal processor 31 (Step SS2). Similarly, the second A/D converter 22 successively receives the quadrature component Q(t) and successively supplies the quantized quadrature component Q(kT) to the signal processor 31 (Step SS2).

The signal processor 31 comprises a vector rotating section 32 and an average vector calculating section 33. The vector rotating section 32 is supplied with the quantized inphase component I(kT) and the quantized quadrature component Q(kT). Namely, the vector rotating section 32 is supplied with the quantized vector (I(kT), Q(kT)). The vector rotating section rotates the quantized vector (I(kT), Q(kT)) towards the clockwise direction by the phase angle of the predetermined vector ($I_0$(kT), $Q_0$(kT)) to obtain the rotated vector which has a rotated inphase component $I_R$(kT) and a rotated quadrature component $Q_R$(kT) (Step SS3). As described above, the rotated vector ($I_R$(kT), $Q_R$(kT)) is given by Equation (4) when the first, the second, and the third phase angles $\phi$, $\phi_0$, and $\phi_R$ are given by Equations (1), (2), and (3), respectively.

The rotated vector ($I_R$(kT), $Q_R$(kT)) is successively supplied to the average vector calculating section 33. As described above, the frequency error detecting signal is defined by the signal vectors which rotate by the phase angle $\Delta\phi$ at each one of symbols. Therefore, the average vector calculating section 33 at first calculates the number M of symbols from Equation (11). In a step SS4, the average vector calculating section 33 averages the rotated vectors of 2M to produce the averaged vector ($x_k(\theta)$, $y_k(\theta)$) as a composite vector which is given by:

$$\begin{bmatrix} x_k(\theta) \\ y_k(\theta) \end{bmatrix} = \frac{1}{M} \sum_{i=k}^{k+2M-1} \begin{bmatrix} I_R(iT) \\ Q_R(iT) \end{bmatrix} \quad (20)$$

The averaged vector ($x_k(\theta)$, $y_k(\theta)$) may be given by:

$$\begin{bmatrix} x_k(\theta) \\ y_k(\theta) \end{bmatrix} = \begin{bmatrix} \cos\theta & -\sin\theta \\ \sin\theta & \cos\theta \end{bmatrix} \begin{bmatrix} x_{k-1}(\theta) \\ y_{k-1}(\theta) \end{bmatrix} + \begin{bmatrix} n_{xk} \\ n_{yk} \end{bmatrix} \quad (21)$$

$$= \begin{bmatrix} \cos(k\theta) & -\sin(k\theta) \\ \sin(k\theta) & \cos(k\theta) \end{bmatrix} \begin{bmatrix} x_0(\theta) \\ y_0(\theta) \end{bmatrix} + \begin{bmatrix} n_{xk} \\ n_{yk} \end{bmatrix}$$

By the way, the phase of the averaged vector is not varied when the standard frequency is coincident with the carrier frequency. When the frequency error exists between the standard frequency and the carrier frequency, the phase of the averaged vector is varied. When the time instant t is changed from (k−1)T to kT, $\sin\theta_k$ is given by:

$$\sin\theta_k = \frac{x_{k-1}(\theta)y_k(\theta) - x_k(\theta)y_{k-1}(\theta)}{|r_{k-1}| \cdot |r_k|} \quad (22)$$

where $\theta_k$ represents the phase variation when the time instant t is changed from (k−1)T to kT.

The $|r_k|$ is given by:

$$|r_k|=|(x_k(\theta), y_k(\theta))| \quad (23)$$

$|r_{k-1}|$ is approximately equal to $|r_k|$. When the phase variation $\theta_k$ is very little, the phase variation $\theta_k$ is approximately equal to $\sin \theta_k$. As a result, the phase variation $\theta_k$ is given by:

$$\theta_k = \frac{x_{k-1}(\theta)y_k(\theta) - x_k(\theta)y_{k-1}(\theta)}{x_k^2(\theta) + y_k^2(\theta)} \quad (24)$$

Again referring to FIGS. 4 and 5, the averaged vector has a first component $x_k(\theta)$ and a second component $y_k(\theta)$. The first component $x_k(\theta)$ is supplied from the average vector calculating section 33 to a first delay section 34, a first square section 35, and a first multiplier 36. Similarly, the second component $y_k(\theta)$ is supplied from the average vector calculating section 33 to a second delay section 37, a second square section 38, and a second multiplier 39.

The first delay section 34 gives a delay of a predetermined time to a signal supplied thereto. The predetermined time may be equal to the symbol period T. As a result, the first delay section 34 produces a first delayed component $x_{k-1}(\theta)$ to supply the first delayed component $x_{k-1}(\theta)$ to the second multiplier 39. Similarly, the second delay section 37 gives a delay of the predetermined time to a signal supplied thereto. As a result, the second delay section 37 produces a second delayed component $y_{k-1}(\theta)$ to supply the second delayed component $y_{k-1}(\theta)$ to the first multiplier 36.

The first multiplier 36 multiplies the first component $x_k(\theta)$ by the second delayed component $y_{k-1}(\theta)$ to supply a first multiplied component $x_k(\theta)y_{k-1}(\theta)$ to a subtracter 40. The second multiplier 39 multiplies the second component $y_k(\theta)$ by the first delayed component $x_{k-1}(\theta)$ to supply a second multiplied component $y_k(\theta)x_{k-1}(\theta)$ to the subtracter 40. The subtracter 40 subtracts the first multiplied component $x_k(\theta)y_{k-1}(\theta)$ from the second multiplied component $y_k(\theta)x_{k-1}(\theta)$ to produce a subtraction component which is represented by $x_{k-1}(\theta)y_k(\theta)-x_k(\theta)y_{k-1}(\theta)$.

The first square section 35 squares the first component $x_k(\theta)$ into a first squared component $x_k^2(\theta)$. Similarly, the second square section 38 squares the second component $y_k(\theta)$ into a second squared component $y_k^2(\theta)$. Supplied with the first squared component $x_k^2(\theta)$ and the second squared component $y_k^2(\theta)$, an adder 41 calculates a sum of the first squared component $x_k^2(\theta)$ and the second squared component $y_k^2(\theta)$ to produce a sum component which is represented by $x_k^2(\theta)+y_k^2(\theta)$.

Supplied with the subtraction component and the sum component, a phase variation calculating section 42 calculates the phase variation $\theta_k$ by the use of the subtraction component and the sum component. Namely, the phase variation calculating section 42 calculates the phase variation $\theta_k$ on the basis of Equation (24) at a step SS5. The phase variation $\theta_k$ is supplied to an average calculating section 43.

The average calculating section 43 calculates the average $\theta_{AVG}$ of the phase variation $\theta_k$ at each one of symbols at a step SS6. Namely, the average calculating section 43 calculates the average $\theta_{AVG}$ from Equation (25) given by:

$$\theta_{AVG} = \frac{1}{N-2M+1} \sum_{k=0}^{N-M} \theta_k \quad (25)$$

Supplied with the average $\theta_{AVG}$, a frequency error calculating section 44 calculates the frequency error between the standard frequency and the carrier frequency in accordance with the average $\theta_{AVG}$. For example, the frequency error calculating section 44 divides the average $\theta_{AVG}$ by $2\pi$ radians to produce $\theta_{AVG}/2\pi$. Furthermore, the frequency error calculating section 44 divides $\theta_{AVG}/2\pi$ by the symbol period T to produce the frequency error $\Delta f$ at a step SS7. The frequency error calculating section 44 outputs the frequency error as a frequency error signal.

What is claimed is:

1. A frequency error detecting device for use in combination with a demodulating section for receiving a transmitted signal through a transmission path to quadrature demodulate said transmitted signal into a demodulated signal with reference to a standard signal of standard frequency, said transmitted signal having a carrier signal of a carrier frequency and being defined by a signal vector sequence including a set of signal vectors each of which has a phase variation equal to a predetermined phase variation, said signal vectors being defined by a sequence of symbols at a predetermined symbol rate, said demodulated signal being defined by a sequence of demodulated vectors, said frequency error detecting device for detecting a frequency error between said standard frequency and said carrier frequency to produce a frequency error signal, wherein said predetermined sampling rate is equal to said predetermined symbol rate, said frequency error detecting device comprising:

first means for sampling said demodulated vectors at a predetermined sampling rate to quantize said demodulated vectors into quantized vectors;

second means for compounding a composite vector from said quantized vectors within a predetermined number of said quantized vectors, said predetermined number being equal to the number of said demodulated vectors in a phase variation of $2\pi$ radian; and third means for calculating a phase difference between said composite vector and a predetermined vector to produce said frequency error signal.

2. A frequency error detecting device as claimed in claim 1, wherein said second means comprises:

rotating means for rotating each of said quantized vectors by a phase angle of said predetermined vector to produce a sequence of rotated vectors; and average means for averaging said rotated vectors within said predetermined number to produce said composite vector.

3. A frequency error detecting device as claimed in claim 2, wherein said third means comprises:

phase variation error detecting means for detecting a phase variation error between said composite vector and said predetermined vector to produce a phase variation error signal;

phase difference calculating means for calculating said phase difference in accordance with said phase variation error signal; and frequency error calculating means for calculating said frequency error on the basis of said phase difference to produce said frequency error signal.

4. A frequency error detecting device as claimed in claim 2, wherein:

said predetermined phase variation is equal to $\pi/2$ radians while said predetermined number is equal to four.

5. A frequency error detecting device as claimed in claim 4, wherein said transmitted signal is subjected to Gaussian minimum shift keying.

6. A frequency error detecting device as claimed in claim 2, wherein:

said predetermined phase variation is equal to $-\pi/2$ radians while said predetermined number is equal to four.

7. A frequency error detecting device as claimed in claim 6, wherein said transmitted signal is subjected to Gaussian minimum shift keying.

* * * * *